US012747115B2

(12) United States Patent
Chianura

(10) Patent No.: US 12,747,115 B2
(45) Date of Patent: Sep. 29, 2026

(54) APPARATUS FOR TRANSPORTING OBJECTS

(71) Applicant: I.M.A. INDUSTRIA MACCHINE AUTOMATICHE S.P.A., Ozzano Dell'Emilia (IT)

(72) Inventor: Mattia Chianura, Ozzano Dell'Emilia (IT)

(73) Assignee: I.M.A INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 140 days.

(21) Appl. No.: 18/727,412

(22) PCT Filed: Jan. 10, 2023

(86) PCT No.: PCT/IT2023/050002
§ 371 (c)(1),
(2) Date: Jul. 9, 2024

(87) PCT Pub. No.: WO2023/135615
PCT Pub. Date: Jul. 20, 2023

(65) Prior Publication Data

US 2025/0115443 A1 Apr. 10, 2025

(30) Foreign Application Priority Data

Jan. 11, 2022 (IT) ........................ 102022000000254

(51) Int. Cl.
*B65G 54/02* (2006.01)
*B65G 61/00* (2006.01)

(52) U.S. Cl.
CPC ............. *B65G 54/02* (2013.01); *B65G 61/00* (2013.01); *B65G 2207/40* (2013.01)

(58) Field of Classification Search
None
See application file for complete search history.

(56) References Cited

U.S. PATENT DOCUMENTS 6,800,818 B2 * 10/2004 Balboni .................. B67C 3/202 177/52
2016/0347550 A1 * 12/2016 Paweletz ................ B65G 54/02
(Continued)

FOREIGN PATENT DOCUMENTS

DE 102015209625 A1 12/2016
EP 4106160 A1 * 12/2022 ........... H02K 41/031
(Continued)

OTHER PUBLICATIONS

International Search Report filed in PCT/IT2023/050002 mailed Apr. 7, 2023.

*Primary Examiner* — Mark A Deuble
*Assistant Examiner* — Muhammad Awais
(74) *Attorney, Agent, or Firm* — RANKIN, HILL & CLARK LLP

(57) ABSTRACT

A transport apparatus for transporting objects includes a reference surface, at least one transport member for supporting and transporting the objects with respect to the reference surface, magnetic members and electric energizing members configured to interact with the magnetic members and consequently cause the selective displacement of the transport member. The apparatus includes a safety appendage configured to prevent damage to the at least one transport member.

13 Claims, 4 Drawing Sheets

(56) References Cited

U.S. PATENT DOCUMENTS

| | | | | |
|---|---|---|---|---|
| 2019/0152724 | A1 * | 5/2019 | Philipp .................. | B65G 43/00 |
| 2021/0336522 | A1 * | 10/2021 | Flixeder ................. | H02K 16/00 |

FOREIGN PATENT DOCUMENTS

| | | | |
|---|---|---|---|
| EP | 3904249 | B1 | 3/2023 |
| JP | H01286701 | A | 11/1989 |
| JP | 2546335 | B2 * | 10/1996 |

* cited by examiner

APPARATUS FOR TRANSPORTING OBJECTS

FIELD OF THE INVENTION

The present invention concerns an apparatus for automatically transporting one or more objects, for example components for making a product or a package, to and from a plurality of processing stations. The apparatus according to the invention can be used, for example, in a machine for making packages of products, especially low-mass products, for example in the chemical, cosmetic and/or pharmaceutical sector, such as bottles, flasks, caps, ferrules or other objects of similar sizes.

BACKGROUND OF THE INVENTION

In the industrial sector of packaging chemical, cosmetic and/or pharmaceutical products, various machines and methods are known for automatically transporting one or more components to make a package, in particular a package for a low-mass product, such as bottles, flasks, caps, ferrules, or other objects of similar sizes, from and to one or more processing stations, many of which are designed, manufactured and marketed by the present Applicant.

In this sector, there is an increasing demand for machines that can move the components to make the package from one processing station to another, in a safe and aseptic, ecologically sustainable and silent environment, without generating pollutants and agents that can contaminate the product and/or its content, and in which the human intervention to carry out the usual operations in the sector (cleaning, format change, maintenance, monitoring of biological tests, or other) is reduced to a minimum, if not completely eliminated.

In particular, transport devices of the electromagnetic type have been developed, also called "planar motors", which comprise magnetic means which cooperate with associated electric energizing means and configured to selectively generate one or more magnetic fields to influence said magnetic means. In planar motors, the magnetic means are usually configured as coils included in a mobile transport member, and the electric energizing means are incorporated inside a fixed surface on which the transport member can move without contact thanks to the controlled electromagnetic field which is generated between the magnetic means and the electric energizing means.

These planar motors are very versatile, given that they allow to follow trajectories and paths that are either rectilinear or curved with respect to a movement surface, by suitably controlling the electric energizing means.

Furthermore, these planar motors can be advantageously used both on horizontal as well as inclined movement surfaces, or even on vertical or upturned movement surfaces.

However, when said planar motors are used on vertical movement surfaces, they are exposed to the risk of suffering damage, even serious damage, for example if critical situations occur, and/or situations in which there is no correct interaction between the magnetic fields generated by the electric energizing means and the magnetic fields on the transport devices.

Such critical situations can occur, for example, when there is an interruption in the supply of electrical energy to the electric energizing means, with consequent cancellation of the magnetic fields and therefore of the magnetic attraction force which allows the transport devices to be kept in position with respect to the movement surface.

Planar motors which integrate a device configured as a safety system which intervenes in the event of sudden interruptions in the supply of electrical energy are described in patent application DE 102015209625 A1.

However, critical situations can also occur when control of one or more magnetic means is lost, even without any interruption to the electrical energy supply.

This can occur in the event of a request for excessive dynamic performance from the transport devices, or also due to possible collisions between two or more transport devices, for example due to the unbalancing or slowing down of one or more of them. Furthermore, the collision of a transport device with other machine parts could also lead to a critical situation.

In all these critical situations, the transport device is not supported adequately and with full control by the electromagnetic fields generated by the electric energizing means and can therefore fall downward due to the force of gravity.

By carrying out operating tests on machines provided with such transport devices, the Applicant has found that, if the planar motors, or the transport devices, fall, they can suffer very serious damage due to the impact, in particular the magnetic means can break, rendering the transport devices unusable.

Since, as is known, these transport devices are very expensive and difficult to repair in the event of considerable damage to the magnetic means, it is necessary to adopt measures to guarantee their correct operation even on inclined and/or vertical surfaces.

There is therefore a need to perfect an apparatus for transporting objects which can overcome at least one of the disadvantages of the state of the art.

To do this it is necessary to solve the technical problem of ensuring that the mobile part of each planar motor, that is, said transport device, can operate normally, in compliance with its design specifications, but at the same time that the same mobile part is prevented from falling, with any type of motion, in an uncontrolled manner in the event of any malfunction.

Therefore, one purpose of the present invention is to provide an apparatus for transporting objects which is reliable and not subject to the risk of causing damage or breakage to one or more objects.

Another purpose of the present invention is to provide an apparatus for transporting objects which allows any critical situations to be managed quickly and effectively, at the same time safeguarding the integrity of the transport devices.

Another purpose of the present invention is to provide an apparatus for transporting objects which is safe and suitable for use also in machines for the chemical, cosmetic and/or pharmaceutical sector, which normally require a work environment that is substantially aseptic and free from contaminants.

The Applicant has devised, tested and embodied the present invention to overcome the shortcomings of the state of the art and to obtain these and other purposes and advantages.

SUMMARY OF THE INVENTION

The present invention is set forth and characterized in the independent claim. The dependent claims describe other characteristics of the present invention or variants to the main inventive idea.

In accordance with the above purposes, and to resolve the technical problem disclosed above in a new and original way, also achieving considerable advantages compared to the state of the prior art, a transport apparatus for transporting one or more objects, according to the present invention, comprises a support wall having at least one reference surface perpendicular, or inclined by a determinate angle, with respect to a horizontal plane; at least one transport member, configured to support and transport the one or more objects and to be able to move without contact with respect to the reference surface, remaining at a first distance from the latter; and electric energizing means configured to selectively generate one or more magnetic fields associated with the reference surface, wherein the at least one transport member comprises magnetic means configured to interact with the electric energizing means and consequently cause the selective displacement of the at least one transport member.

In particular, thanks to the cooperation between the electric energizing means and the magnetic means, the at least one transport member can move on the reference surface independently, without contact and without constraints on direction or path.

In accordance with one aspect of the present invention, the apparatus as above also comprises a safety appendage which extends for a predetermined length, wherein a first end thereof is stably attached on a surface of the at least one transport member and a second end thereof is:

either permanently attached to an upper part of the support wall, or to a fixed element, or alternatively conformed to temporarily cooperate with the support wall or with the fixed element, in the event of a lack of electric power or of correct interaction between the electric energizing means and the magnetic means.

The safety appendage defines safety means of the apparatus, configured to intervene when a correct interaction between the electric energizing means and the magnetic means is missing, so as to prevent damage to the at least one transport member and ensure the movement of the latter, without contact, with respect to the reference surface when the correct interaction between the electric energizing means and the magnetic means is restored.

For example, the safety means can be configured to prevent the transport member from moving away from the reference surface by a distance greater than the first distance when a correct interaction between the electric energizing means and the magnetic means is missing.

In particular, the safety means are configured to intervene when any critical situation occurs in which the magnetic means do not interact correctly with the magnetic fields generated by the electric energizing means.

A critical situation can occur whenever the magnetic fields are not sufficient to exert a magnetic attraction force sufficient to overcome the force of gravity acting on the transport member and the object supported thereby, and keep the transport member at a desired distance with respect to the reference surface.

Possible critical situations can be, for example, the interruption of the supply of electrical energy to the electric energizing means, with consequent cancellation of the magnetic fields, an unbalancing of the transport member with respect to the reference surface, whereby one or more of the magnetic means fail to interact with the magnetic fields, or even a possible collision between two or more transport members.

Furthermore, another possible critical situation can comprise the collision, or unwanted interaction, between one of the transport members and another machine member or, possibly, with an operator.

The collisions can occur, for example, due to an overload of the transport member, caused by an excessive weight of the objects transported, for example due to an unexpected and sudden increase in such weight, with a consequent reduction in speed and/or deviation of the transport member with respect to a predefined path.

Therefore, the safety appendage advantageously allows to prevent any damage to the transport members in the event of an accidental or unwanted interruption of the electric power supply to the electric energizing means, promptly resuming operation of the apparatus without the need for particular interventions by an operator.

In accordance with another aspect of the present invention, the safety means are of the mechanical type.

In accordance with another aspect of the present invention, the safety appendage comprises at least one tether connected, in correspondence with the second end, to the upper part of the support wall, or to the fixed element, and, in correspondence with the first end, opposite the second end, to the transport member, wherein the length of the flexible member is such as to prevent the transport member from reaching the horizontal plane.

In accordance with another aspect of the present invention, the tether is of the automatically retractable type.

In accordance with another aspect of the present invention, the safety appendage comprises at least one rigid fastening member associated, by means of the first end, with the transport member and having the second end hooked, so that it is able to temporarily fasten to the support wall, or to the fixed element.

In accordance with another aspect of the present invention, the fixed element is associated with the support wall.

In accordance with another aspect of the present invention, the transport member comprises at least one front surface, facing toward the support surface, and a rear surface, opposite the front surface. Furthermore, the safety appendage comprise at least rest means attached with the first end to the rear surface of the transport member and configured to selectively rest against a base wall with the second end.

In accordance with another aspect of the present invention, the rest means comprise at least one L-shaped rigid rod.

In accordance with another aspect of the present invention, the transport member also comprises a base surface facing toward the base wall, and the at least one rigid rod comprises an end substantially aligned with the base surface, whereby, when the latter is in contact with the base wall, the end is also in contact with the base wall, so that the front surface of the transport member remains constantly parallel to the reference surface.

In accordance with another aspect of the present invention, the transport member also comprises a base surface facing toward the base wall, and the rest means comprise a rest plate attached to the rear surface of the transport member and provided with a rest surface facing toward the base wall. The rest surface is distant from the transport member, being disposed at a lower level with respect to the base surface, so that, in the event of a fall, it is the rest surface of the rest plate, and not the transport member, that impacts against the base wall.

In accordance with another aspect of the present invention, the apparatus comprises a support wall which departs from the base wall and is provided with an operating surface, parallel to the reference surface, disposed at a second distance from the latter and configured to cooperate with the rest plate when it impacts against the base wall.

In accordance with another aspect of the present invention, the second distance is at least equal to, but preferably greater than, the sum of the thicknesses of the transport member and of the rest plate, and possibly also of the first distance.

In accordance with another aspect of the present invention, the apparatus also comprises recovery means configured to return the transport member in proximity to the support wall, for example, following an unwanted distancing of the transport member with respect to the support wall.

The presence of the recovery means advantageously allows to rapidly restore the operation of the transport apparatus following the occurrence of one of the critical situations described above.

In accordance with another aspect of the present invention, the recovery means are associated with the at least one reference surface and/or with the base wall, if present.

In accordance with another aspect of the present invention, the recovery means are configured as a manipulator, for example an articulated manipulator such as a robot with several work axes.

In accordance with the above purposes, and to resolve the technical problem disclosed above in a new and original way, also achieving considerable advantages compared to the state of the prior art, a transport apparatus for transporting one or more objects, according to the present invention, comprises a support wall having at least one reference surface perpendicular, or inclined by a determinate angle, with respect to a horizontal plane; at least one transport member, configured to support and transport the one or more objects and to be able to move without contact with respect to the reference surface, remaining at a first distance from the latter; and electric energizing means configured to selectively generate one or more magnetic fields associated with the reference surface, wherein the at least one transport member comprises magnetic means configured to interact with the electric energizing means and consequently cause the selective displacement of the at least one transport member. The transport apparatus also comprises recovery means configured to return the transport member in proximity to the support wall, for example, following an unwanted distancing of the transport member with respect to the support wall.

DESCRIPTION OF THE DRAWINGS

These and other aspects, characteristics and advantages of the present invention will become apparent from the following description of some embodiments, given as a non-restrictive example with reference to the attached drawings wherein.

Figure 1:
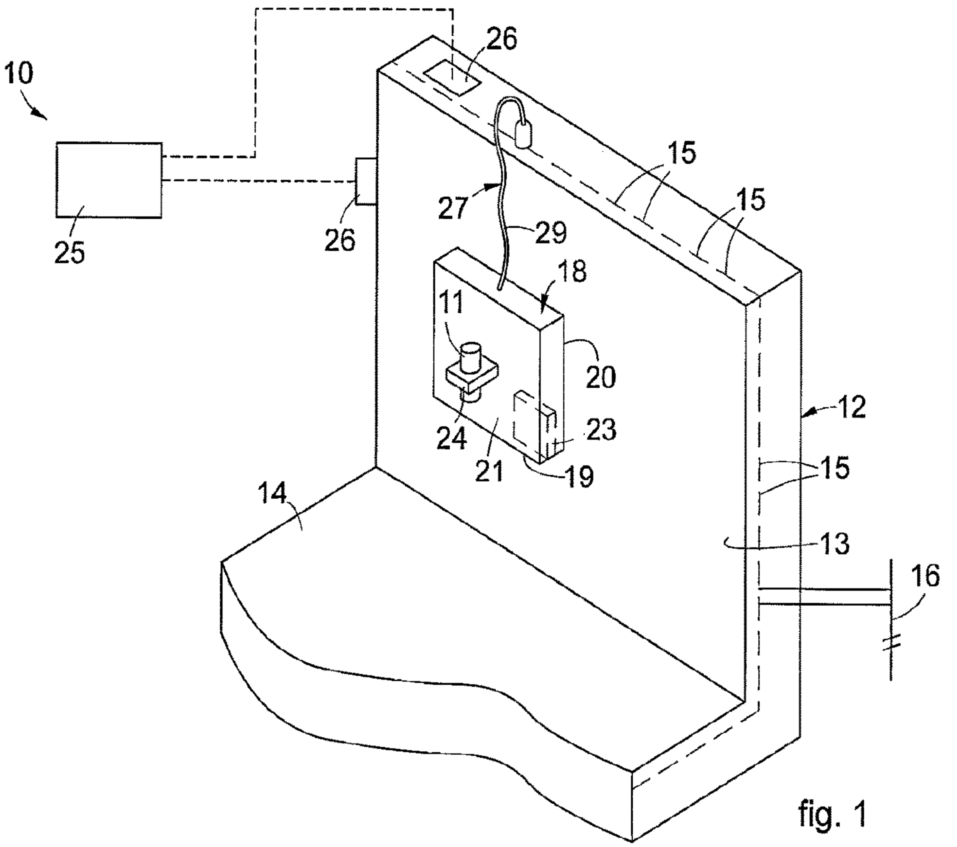
FIG. 1 is a three-dimensional and schematic view of an apparatus for transporting objects, according to the present invention, in accordance with a first embodiment.

We must clarify that in the present description the phraseology and terminology used, as well as the figures in the attached drawings also as described, have the sole function of better illustrating and explaining the present invention, their function being to provide a non-limiting example of the invention itself, since the scope of protection is defined by the claims.

To facilitate comprehension, the same reference numbers have been used, where possible, to identify identical common elements in the drawings. It is understood that elements and characteristics of one embodiment can be conveniently combined or incorporated into other embodiments without further clarifications.

DESCRIPTION OF SOME EMBODIMENTS OF THE PRESENT INVENTION

With reference to FIG. 1, an apparatus 10 according to the present invention is configured to automatically transport one or more objects 11 according to desired paths or directions, from a starting point to an arrival point.

The apparatus 10 can be used, for example, in a machine for packaging products in the chemical, cosmetic and/or pharmaceutical sectors, to transport one or more objects 11, or components, to and from one or more work stations.

The one or more objects 11 can comprise containers usable in the chemical, medical and pharmaceutical fields, for example flasks, bottles or even dosing nozzles configured to fill such containers.

The machine, which is not shown in the drawings, can be, for example, of the type described in international patent application WO2021/001863A1 filed by the Applicant, and essentially comprises a plurality of work stations, disposed in a direction of feed having rectilinear and/or curved segments.

The apparatus 10 comprises a support wall 12 having a reference surface 13 which can be either vertical (FIGS. 1, 2 and from 4 to 10), or inclined by a determinate angle $\alpha$ (FIG. 3), which can have any value whatsoever, with respect to a horizontal plane PO of a base wall 14. Alternatively, the reference surface 13 can have any development whatsoever and comprise vertical, horizontal, curved and/or inclined parts.

The base wall 14 (FIG. 1) can be any substantially horizontal wall whatsoever, whether of the apparatus 10 or of the machine in which the latter is installed, or the floor on which the machine itself rests.

Electric energizing means 15, of a known type and not shown in detail, are associated with the reference surface 13 which are configured to selectively generate one or more magnetic fields, even distributed locally, in determinate zones of the same reference surface 13.

For example, the electric energizing means 15 comprise a plurality of electric coils or windings, not shown in the drawings, suitably disposed, for example in the support wall 12, connected, during use, to a network 16 (FIG. 1) for the supply of electrical energy having suitable values of electric voltage and current.

The support wall 12 can be a single wall, and contain inside it a plurality of electric energizing means 15 disposed according to a predefined pattern, or it can be made with a plurality of modules, each comprising its own electric energizing means 15, disposed adjacent to each other. In the latter case, the reference surface 13 is defined as a whole by the surfaces of the single modules.

A plurality of transport members 18, of which only one is schematically shown in the attached drawings, are associated with the reference surface 13, each of which can be moved with respect to the reference surface 13 thanks to the magnetic fields generated by the electric energizing means 15.

For example, each transport member 18 can comprise a base, that is, a polygonal, regular or irregular plan, in particular quadrangular, for example square or rectangular, or having other polygonal shapes defined by a closed broken line, or by a combination of straight and curved lines.

Each transport member 18 comprises a base surface 19 facing toward the base wall 14 (FIGS. 6 and 8), a front surface 20 facing toward the reference surface 13 and a rear surface 21, opposite and parallel to the front surface 20.

In certain embodiments, each transport member 18 can be provided with magnetic means 23, such as permanent magnets for example, of a known type and not shown in detail in the drawings.

The magnetic means 23 are configured to interact with one or more of the magnetic fields generated by the electric energizing means 15, so that each transport member 18 can move independently with respect to the reference surface 13, remaining slightly distanced with respect thereto, that is, without contact.

For example, during each displacement, the transport member 18 can be operatively kept at a determinate first distance D1 (FIGS. 2, 4, 6 and 10), comprised between about 0.2 mm and about 4.5, mm with respect to the reference surface 13. We must clarify that in the present description by the expression "first distance D1" we mean a distance, constant or variable, such as to allow a correct interaction between the electric energizing means 15 and the magnetic means 23, and therefore comprised in the range of reference values disclosed above.

The transport members 18 are preferably made as the mobile parts of magnetically driven "planar motors", per se known in the state of the art.

Each transport member 18 is configured to be moved and/or rotated with respect to the reference surface 13, as well as independently and without contact, even without any constraint on path or direction whatsoever, advantageously with several degrees of freedom.

The transport members 18 can be provided with support means 24, installed in correspondence with the rear surface 21, configured to sustain, at least temporarily, but stably, one or more objects 11.

The support means 24 can be of a known type and comprise, for example, gripping means each suitable to grip a single component 11, or a tray or container on which a plurality of objects 11 can be positioned.

The apparatus 10 also comprises control means, for example consisting of, or comprising, a control unit 25, configured to control the selective energizing of the electric energizing means 15 in relation to the path, or trajectory, that each transport member 18 follows during its movement.

The control unit 25 can comprise, for example, one or more processors, of a type known per se and programmable.

In particular, the control unit 25 is able to control, selectively and in a programmed manner, the values of electric current and/or voltage to be supplied to the electric energizing means 15, so that the latter can generate magnetic fields suitable to cause both the support of each transport member 18 in a determinate position of the reference surface 13, and also the selective movement of each support member 18 along the reference surface 13, according to a predefined path.

According to some embodiments, the apparatus 10 also comprises position sensors 26 associated with at least one of either the reference surface 13 or the at least one transport member 18, suitable to detect one or more of either the position, speed of advance or possibly other parameters correlated to the movement of each transport member 18, and transmit the corresponding data to the control unit 25.

In this way, the control unit 25 can carry out a feedback control of the electric energizing means 15 in order to move each transport member 18 according to a respective path.

According to one aspect of the present invention, the transport apparatus 10 comprises a safety appendage 27 configured to prevent the disassociation between the transport members 18 and the reference surface 13 when critical operating situations occur.

The critical operating situations can comprise, for example, situations in which the magnetic means 23 do not interact correctly with the magnetic fields generated by the electric energizing means 15.

The safety appendage 27 can be configured as a safety mean of the mechanical type configured to prevent, stop or mitigate a fall of the transport member 18 when the critical operating situations occur.

Figure 2:
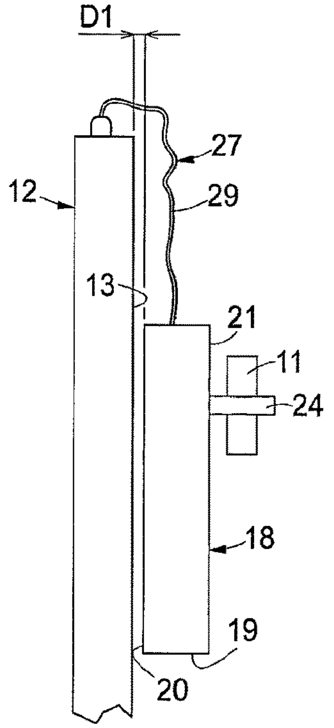
FIG. 2 is a schematic lateral view of the apparatus of FIG. 1.
Figure 3:
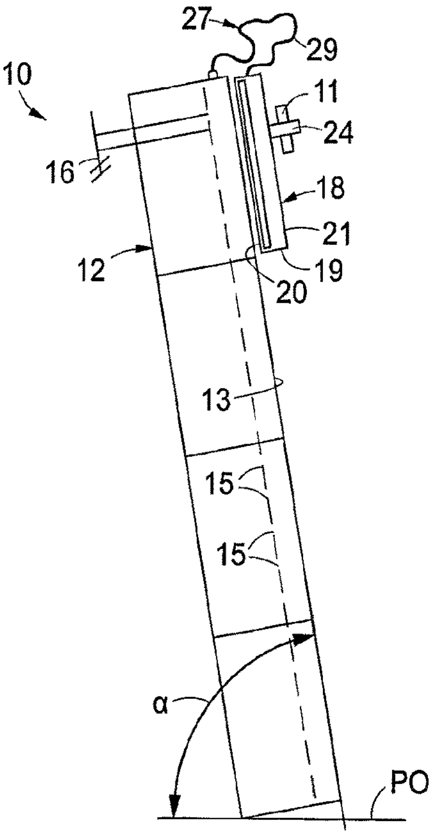
FIG. 3 is a schematic lateral view of an apparatus for transporting objects, according to the present invention, in accordance with a second embodiment.

According to the embodiments shown in FIGS. 1, 2 and 3, the safety appendage 27 comprises a tether 29 of the inextensible type, connected with a first end thereof to the transport member 18 and with a second end thereof, opposite the first end, to an upper part of the support wall 12, or to a fixed member, not shown in these drawings and associated or integral with the support wall 12.

The connection of the second end of the tether 29 to the support wall 12 or to the fixed member associated therewith can be either of the rigid type or of the sliding type.

In this way, the tether 29 advantageously allows the front surface 20 of the support member 18 to always remain substantially parallel to the reference surface 13, even in the event of a malfunction of the electric energizing means 15.

The tether 29 can comprise, or consist of, a rope, a line, a cable, a chain with interconnected links or any other flexible element whatsoever, configured to sustain the transport member 18 and prevent it from reaching the horizontal plane PO in the event that a correct interaction between the electric energizing means 15 and the magnetic means 23 is missing.

In the event of an accidental, unwanted or undesired fall of one or more transport members 18, the presence of the tether 29 prevents these from suffering an impact with the base wall 14.

The length of the tether 29 has to be such as to guarantee that, in the event of an interruption of the power supply from the network 16 or malfunction of the electric energizing means 15, the transport member 18 does not fall in an uncontrolled manner onto the base wall 14.

To manufacture the tether 29, materials are preferred which, in the event of sliding and deterioration, do not release any particles that could pollute the work environment and/or damage the objects 11 and/or their contents.

In this way, once the correct operation of the electric energizing means 15 has been restored, the apparatus 10 can resume operation without requiring particular and laborious interventions by an operator.

Furthermore, according to embodiments not shown in the attached drawings, the tether 29 can be not connected directly to the support wall 12, but to any fixed element associated with the latter.

According to one possible variant, not shown in the attached drawings, the tether 29 can be, for example, of the retractile and/or retractable type.

The embodiments which provide the tether 29 are particularly suitable if the transport member 18 performs limited movements on the reference surface 13, for example repetitive alternating movements between an outward travel and a return travel. By way of a non-limiting example, these embodiments are suitable to be used in cases where the support means 24 of the transport member 18 support one or more dosing nozzles configured to fill the objects with a dosed quantity of product, in correspondence with a dosing station.

It is easy to understand that such embodiments in which the tether 29 is provided are also suitable for many other applications, but it is preferable for this element to not be not excessively long, so that its presence does not become problematic, for example hindering the movement of the transport member 18 itself, in the event that the tether 29 becomes twisted or entangled in other elements.

Figure 4:
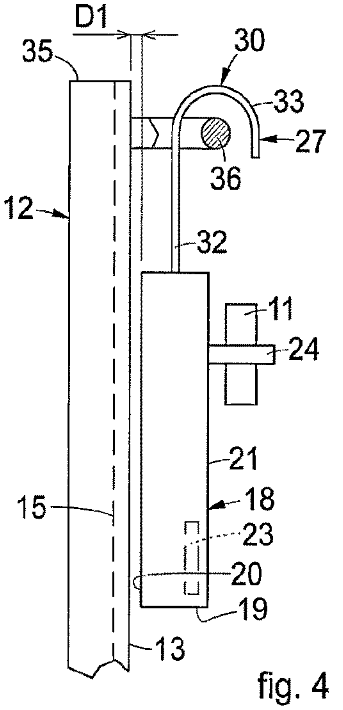
FIG. 4 is a schematic lateral view of an apparatus for transporting objects, according to the present invention, in accordance with a third embodiment.
Figure 5:
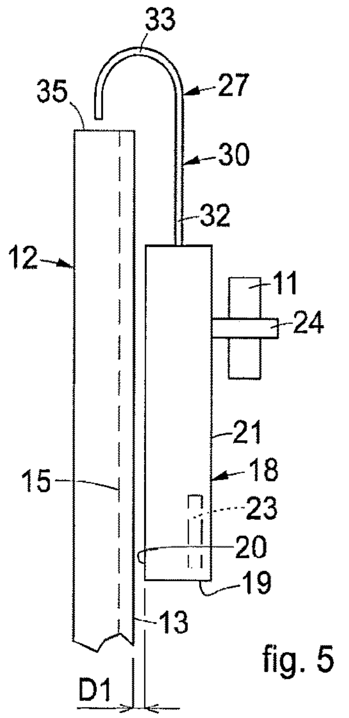
FIG. 5 is a schematic lateral view of an apparatus for transporting objects, according to the present invention, in accordance with a fourth embodiment.

According to another embodiment of the present invention, shown in FIGS. 4 and 5, the safety appendage 27 comprises a rigid fastening member, or hook, 30, associated with the transport member 18 by means of a first end.

The hook 30 is configured to prevent the transport member 18 from accidentally falling onto the base wall 14 below, for example in the event of a lack of electric power supply from the network 16 and/or a malfunction of the electric energizing means 15 (FIG. 1), and it comprises, by way of a non-limiting example, a rectilinear portion 32 (FIGS. 4 and 5) attached to the upper surface of the transport member 18 and a curved portion 33. The curved portion 33 defines the second end of the safety appendage 27 which, in this embodiment, has a hooked shape.

In particular, the hook 30 is configured to fasten to an upper surface 35 of the support wall 12, or to a fixed member 36 associated with the latter.

In the event of accidental or unwanted interruption of the electric power supply or malfunction of the electric energizing means 15, the presence of the hook 30 prevents an accidental fall of the corresponding transport member 18 against the base wall 14.

The length of the hook 30 has to be such as to guarantee a correct mobility to the corresponding transport member 18.

Furthermore, the presence of the hook 30 advantageously allows the front surface 20 of the transport member 18 to always remain facing toward the reference surface 13 and parallel to it, both in the event that a correct interaction between the electric energizing means 15 and the magnetic means 23 is missing, and also in the event of a fall and/or collision between two or more transport members 18.

This embodiment, which provides the presence of the hook 30, is also particularly suitable if the transport member 18 performs limited movements on the reference surface 13, for example repetitive alternating movements between an outward travel and a return travel.

Figure 6:
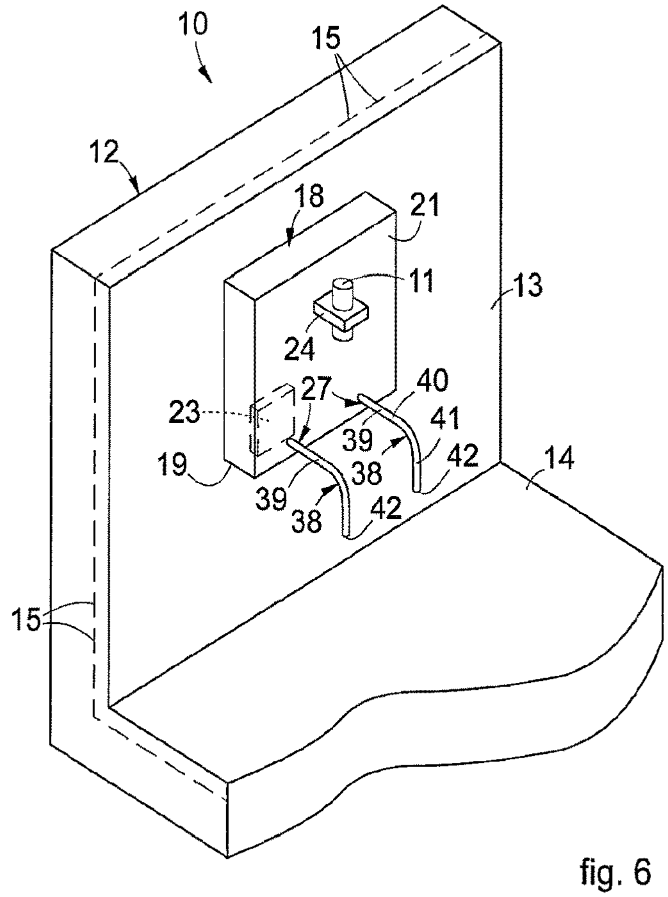
FIG. 6 is a three-dimensional and schematic view of an apparatus for transporting objects, according to the present invention, in accordance with a fifth embodiment.
Figure 7:
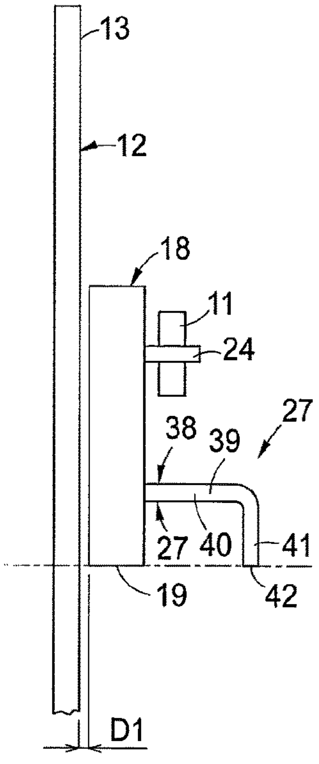
FIG. 7 is a schematic lateral view of the apparatus of FIG. 6.

According to another embodiment of the present invention, shown in FIGS. 6 and 7, the safety appendage 27 comprises rest means 38 attached to the rear surface 21 of the transport member 18.

In one embodiment, the rest means 38 comprise one or more rods 39, two in the example shown here, each of which has a horizontal segment 40 attached to the rear surface 21, and a vertical segment 41 having an end 42 configured to rest against the base wall 14.

As an alternative to the two rods 39, the rest means 31 can comprise one or more props, for example inclined, or a curved plate, not shown in the drawings.

The end 42 of each rod 39 is substantially aligned with the base surface 19 (FIG. 7) so that, when the latter is in contact with the base wall 14, each end 42 of the rods 39 is also in contact with the base wall 14, so that the front surface 20 of the transport member 18 remains practically parallel to, or even slightly inclined with respect to, the reference surface 13, without being excessively distanced from it.

Therefore, the presence of the rods 39 prevents the front surface 20 of the transport member 18 from becoming misaligned with respect to the reference surface 13 in the event of an uncontrolled or unwanted fall of the transport member 18, and therefore allows to prevent the latter from possibly overturning, advantageously simplifying the resumption of operation of the apparatus 10 once the electric power supply has been correctly re-established.

Figure 8:
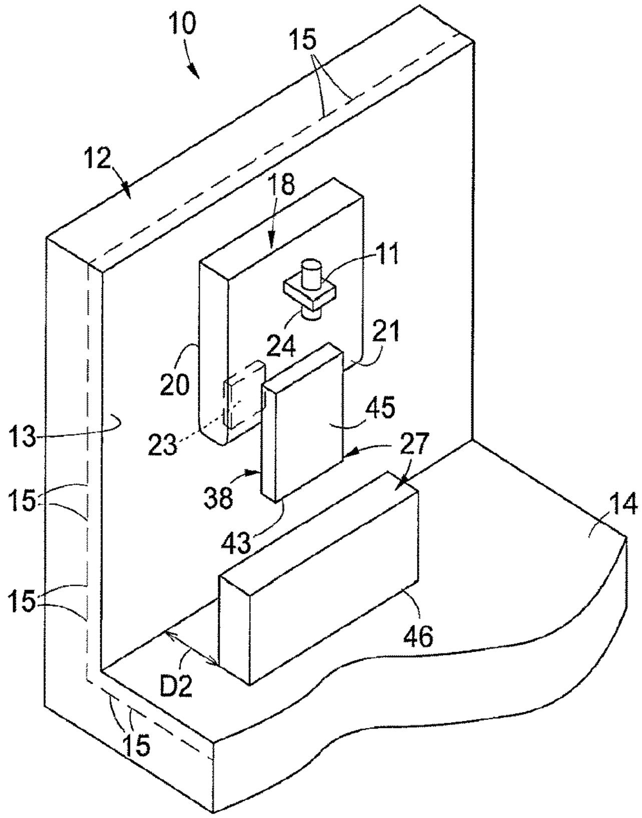
FIG. 8 is a three-dimensional and schematic view of an apparatus for transporting objects, according to the present invention, in accordance with a sixth embodiment and shown in a first operating condition.
Figure 9:
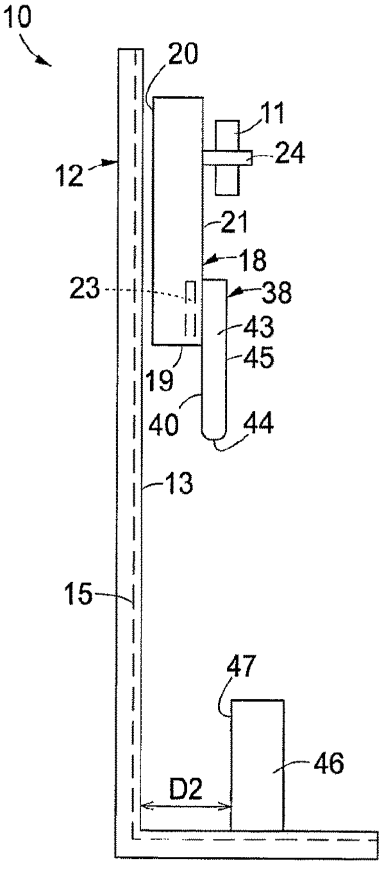
FIG. 9 is a schematic lateral view of the apparatus of FIG. 8.
Figure 10:
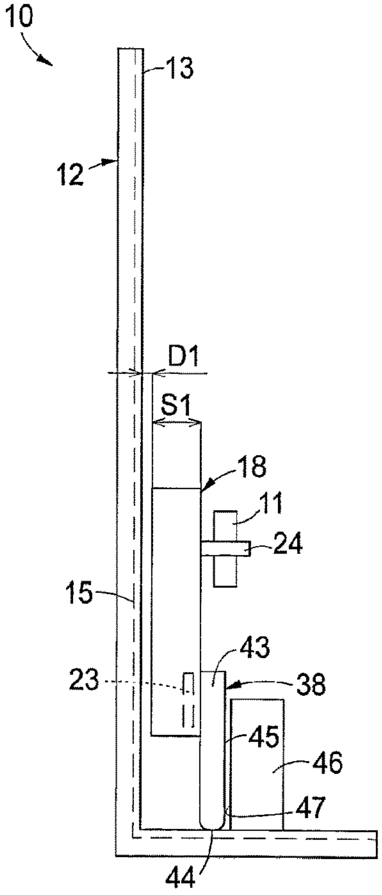
FIG. 10 is a schematic lateral view of the apparatus of FIG. 8 in a second operating condition.

According to another embodiment, shown in FIGS. 8, 9 and 10, the rest means 38 comprise, or consist of, at least one rest plate 43, which in the example given here has the shape of a parallelepiped, but it is not limited to this, and comprises a rest surface 44, facing toward the base wall 14, and a support surface 45.

The rest plate 43 is attached to the transport member 18 so that the rest surface 44 is at a lower level than the base surface 19 of the transport member 18, so that, in the event of an uncontrolled or unwanted fall of the latter, it is the rest plate 43, and not the transport member 18, that impacts against the base wall 14.

Advantageously, the rest plate 43 can be made of elastic or shock-absorbing material, such as rubber, or similar materials.

Furthermore, when the rest plate 43 is present, the apparatus 10 also comprises a support wall 46 which branches off from the base wall 14 and is provided with an operating surface 47, parallel to the reference surface 13 and disposed at a second distance D2 from the latter.

The second distance D2 is at least equal to, but preferably greater than, the sum of the thicknesses of the transport member 18 and of the rest plate 43 and, possibly, also of the distance D1.

Advantageously, the lower part of the rest plate 43, which comprises at least the rest surface 44, and a lower zone of the support surface 45, can be shaped in such a way as to be flared, so as to facilitate its coupling to the support member 46.

In the event of an uncontrolled or unwanted fall of the transport member 18 (FIG. 1), the presence of the support wall 46 prevents the front surface 20 of the latter from becoming misaligned with respect to the reference surface 13, and also allows to prevent the same transport member 18 from possibly overturning.

Figure 11:
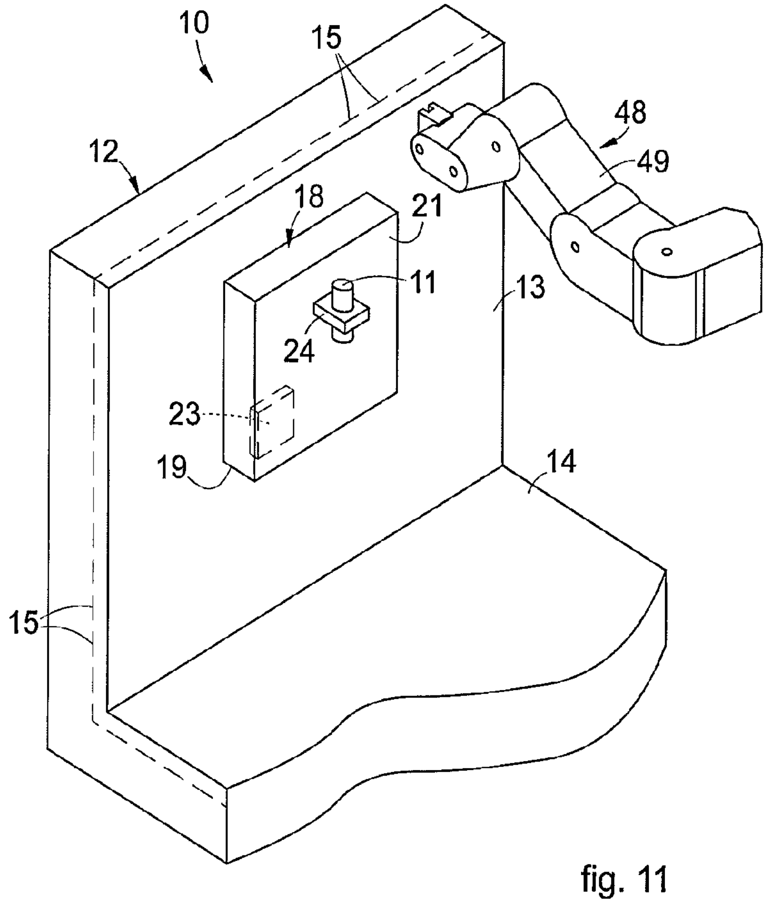
FIG. 11 is a three-dimensional and schematic view of an apparatus for transporting objects, according to the present invention, in accordance with a seventh embodiment.

According to the embodiment shown in FIG. 11, the apparatus 10 comprises recovery means 48 configured to automatically return the transport member 18 in proximity to the support wall 12, for example, following an unwanted distancing of the transport member with respect to the support wall, due to one of the critical operating situations described above.

For example, the recovery means 48 could comprise an anthropomorphic robot 49 and/or a mechanical arm, configured to return the transport member 18 to a distance D1 from the support wall 12, so that its front surface 20 is facing toward the reference surface 13.

According to other embodiments, not shown in the attached drawings, the recovery means 48 could be of the manual type, for example able to be selectively activated by an operator.

The presence of the recovery means 48 advantageously allows to rapidly restore the operation of the transport apparatus 10 following the occurrence of one of the critical operating situations, such as for example the fall of one of the transport members 18 or its uncontrolled disassociation from the reference wall 13, whereby the transport member 18 is no longer in the required position.

According to other embodiments, the recovery means 48 can be provided in combination with all embodiments of the safety appendage described here, even if not shown in the attached drawings.

Alternatively, as shown in FIG. 11, the recovery means 48 can be provided even in the absence of the safety appendage 27.

It is clear that modifications and/or additions of parts may be made to the apparatus 10 as described heretofore, without departing from the field and scope of the present invention, as defined by the claims.

It is also clear that, although the present invention has been described with reference to some specific examples, a person of skill in the art shall certainly be able to achieve other equivalent forms of apparatuses for transporting objects, having the characteristics as set forth in the claims and hence all coming within the field of protection defined thereby. In the following claims, the sole purpose of the references in brackets is to facilitate their reading and they must not be considered as restrictive factors with regard to the field of protection defined by the claims.

The invention claimed is:

1. Transport apparatus for transporting one or more objects, comprising:

a support wall having at least one reference surface perpendicular to, or inclined at a predetermined angle, with respect to, a horizontal plane;

at least one transport member configured to support and transport said one or more objects and to move without contact with respect to said reference surface while remaining at a first distance therefrom; and an electric energizer configured to selectively generate one or more magnetic fields associated with said reference surface, wherein said at least one transport member comprises:

a magnetic element configured to interact with said electric energizer to cause selective displacement of said at least one transport member, and a safety appendage having a predetermined length and including a first end fixedly attached to a surface of said at least one transport member and a second end is configured to engage an upper part of said support wall or a fixed element upon a loss of electric power or loss of operative interaction between said electric energizer and said magnetic element, wherein said safety appendage includes at least one tether having said first end connected to said at least one transport member and said second end connected to said upper part of said support wall or to said fixed element, and wherein a length of said at least one tether is configured to prevent said at least one transport member from reaching said horizontal plane.

2. Transport apparatus as in claim 1 wherein said at least one tether includes an automatically retractable tether.

3. Transport apparatus for transporting one or more objects, comprising:

a support wall having at least one reference surface perpendicular to, or inclined at a predetermined angle with respect to, a horizontal plane;

at least one transport member configured to support and transport said one or more objects and to move without contact with respect to said reference surface while remaining at a first distance therefrom; and an electric energizer configured to selectively generate one or more magnetic fields associated with said reference surface, wherein said at least one transport member comprises:

a magnetic element configured to interact with said electric energizer to cause selective displacement of said at least one transport member; and a safety appendage having a predetermined length and including a first end fixedly attached to a surface of said at least one transport member and a second end configured to engage an upper part of said support wall or a fixed element upon a loss of electric power or loss of operative interaction between said electric energizer and said magnetic element, and wherein said at least one transport member comprises at least one front surface facing toward said reference surface, and a rear surface opposite said front surface, and wherein said safety appendage includes at least one rest element having said first end attached to said rear surface of said at least one transport member and configured to selectively rest against a base wall at said second end.

4. Transport apparatus as in claim 3, wherein said at least one rest element comprises at least one L-shaped rigid rod.

5. Transport apparatus as in claim 4, wherein said at least one transport member further comprises a base surface facing said base wall, and wherein said at least one L-shaped rigid rod comprises an end portion substantially aligned with said base surface such that when the base surface contacts said base wall, said end portion also contacts said base wall, thereby maintaining said front surface of said at least one transport member substantially parallel to, or slightly inclined with respect to, said reference surface.

6. Transport apparatus as in claim 3, wherein said at least one transport member further comprises a base surface facing said base wall, and wherein said at least one rest element includes a rest plate attached to said rear surface of said at least one transport member and having a rest surface facing said base wall, said rest surface being spaced from said at least one transport member, at a level lower than said base surface, such that upon a fall event, said rest surface of said rest plate contacts said base wall prior to said at least one transport member contacting said base wall.

7. Transport apparatus as in claim 6, wherein said fixed element comprises a support structure extending from said base wall and having an operating surface, parallel to said reference surface and disposed at a second distance therefrom, said operating surface being configured to cooperate with said rest plate upon said rest plate contacting said base wall.

8. Transport apparatus as in claim 7, wherein said second distance is greater than or equal to a the sum of a thickness of said at least one transport member and a thickness of said rest plate.

9. Transport apparatus as in claim 3, further comprising a recovery mechanism configured to return said at least one transport member to said support wall upon an unwanted displacement of said at least one transport member away from said support wall.

10. Transport apparatus for transporting one or more objects, comprising:

a support wall having at least one reference surface perpendicular to, or inclined at a predetermined angle with respect to, a horizontal plane;

at least one transport member, configured to support and transport said one or more objects and to move without contact with respect to said reference surface while remaining at a first distance therefrom; and an electric energizer configured to selectively generate one or more magnetic fields associated with said reference surface, wherein said at least one transport member comprises a magnetic element configured to interact with said electric energizer to cause selective displacement of said at least one transport member, and a recovery mechanism configured to be selectively activatable upon detection of an unwanted displacement of said at least one transport member away from said support wall and, upon activation, configured to return said at least one transport member to said support wall.

11. Transport apparatus as in claim 10, wherein said recovery mechanism is associated with said at least one reference surface.

12. Transport apparatus as in claim 10, wherein said recovery mechanism includes a manipulator.

13. Transport apparatus as in claim 12, wherein said manipulator includes a multi-axis robot.

* * * * *